United States Patent [19]

Koyanagi et al.

[11] Patent Number: 5,404,530
[45] Date of Patent: Apr. 4, 1995

[54] INFORMATION MANAGING APPARATUS

[75] Inventors: Haruo Koyanagi; Kazuyoshi Abe, both of Tokyo; Tohru Nishiyama, Ayase; Minoru Nomaru, Yokohama; Tomoyasu Yamazaki, Tokyo; Tomohiko Noda, Yokohama, all of Japan

[73] Assignee: Nissan Motor Co., Ltd., Yokohama, Japan

[21] Appl. No.: 60,122

[22] Filed: May 12, 1993

[30] Foreign Application Priority Data

May 15, 1992 [JP] Japan .................. 4-123422
May 15, 1992 [JP] Japan .................. 4-123423
May 15, 1992 [JP] Japan .................. 4-123424

[51] Int. Cl.⁶ ................................. G06F 13/00
[52] U.S. Cl. .................. 395/700; 364/DIG. 1
[58] Field of Search .................. 395/650, 700

[56] References Cited

U.S. PATENT DOCUMENTS 4,205,371 5/1980 Feather ............... 364/DIG. 1
4,553,205 11/1985 Porchia .
5,083,262 1/1992 Haff, Jr. ............... 364/DIG. 1

FOREIGN PATENT DOCUMENTS 2240861 1/1991 United Kingdom .

Primary Examiner—Thomas M. Heckler
Attorney, Agent, or Firm—Lowe, Price, LeBlanc & Becker

[57] ABSTRACT

An information managing apparatus comprising memories for storing a single or plural application kits including no decision process and no data storage process. The application kits are defined only by an execution element routine. A software kit interface is provided for constructing the application kits independently of hardware and operating system. The software kit interface includes a library group for storing and processing a flow of the constructed application kits. The information managing apparatus also includes a BASE section for integrally managing temporary storage and process of information shared by the application kits, an operating system interface for supplying a function group to operate the application kits and the BASE section while completely separating the application kits from the hardware and the operating system, and an application program interface for operating with the software kit interface and the application program interface to provide coordination with the application kits with no modification of the memories storing a working sequence operable only with a specified operation system.

5 Claims, 17 Drawing Sheets

FIG.4

+++ WORKING OIL AMOUNT MONITOR +++

| M/C NO | NO | SHORTAGE | EMERGENCY INSTRUCTION FOR SUPPLY OF OIL | NORMAL INSTRUCTION FOR SUPPLY OF OIL | NORMAL |
|---|---|---|---|---|---|
| AA-1 | 1 | | | | |
| AA-2 | 2 | | | | |
| AA-1 | 1 | | | | |
| AA-2 | 2 | ▮ | | | |
| AA-1 | 1 | | | | |
| AA-2 | 2 | | | | |
| AA-1 | 1 | | | | |
| AA-2 | 2 | | | | ▮ |
| AA-1 | 1 | | | | |
| AA-2 | 2 | | | ▮ | |
| AA-1 | 1 | | | | |
| AA-2 | 2 | | | | |
| AA-1 | 1 | | | | |
| AA-2 | 2 | ▮ | | | |
| AA-1 | 1 | | | | |
| AA-2 | 2 | | | | |

[NEXT PAGE] [PREVIOUS PAGE] [MENU]

WHERE m IS THE LAST VIBRATION VALUE DATA AND n IS THE
LAST VALUE OF THE ADDRESS AT WHICH THE LAST VIBRATION
DATA ARE STORED.

FIG.13

| OUTPUT | | INPUT | | DATA CONVERSION INSTRUCTION |
|---|---|---|---|---|
| KIT NAME | DATA NAME | KIT NAME | DATA MANE | |
| MAIN LINE PRODUCTION SEQUENCE ESTIMATION | PRODUCTION PERMUTATION | PART PRODUCTION INSTRUCTION | TENSION ESTIMATION | IN = OUT |
| | PRESENT VALUE | | STOCK DATA | IN = OUT-YOBI |
| STOCK MANAGMENT | | | | |
| ⋮ | ⋮ | ⋮ | ⋮ | ⋮ |

FIG.14

| KIT NAME | KIND | CONDITION |
|---|---|---|
| PART PRODUCTION INSTRUCTION | START | (ESTIMATED TENSION DATA) ON |
| | EVENT | (DATA READING) = OUT-TRIG |
| | STOP | SYSTEM STOP ON |
| ⋮ | ⋮ | ⋮ |

INFORMATION MANAGING APPARATUS

BACKGROUND OF THE INVENTION

This invention relates to an information managing apparatus for integrated management of information or data used in performing work in a factory or office.

Computers are utilized to construct a factory or office automation system for integrated management of information and work. Normally, programs and data cannot be used mutually between different types of computer. It is now assumed that an original program is prepared to operate one type of computer used for automatic management of work in a factory A. The original program can be utilized for the automatic management in another factory B if the computer used for automatic management in the factory B is of the same type as the computer used in the factory A. Otherwise, the original program cannot be utilized without coordination of the original program with the computer used in the factory B. However, this coordination requires substantially the same amount of labor as required in preparing another program for the computer used in the factory B. If additional work is required in the factory B, some program segments should be incorporated into the coordinated program. Even when this incorporation is made with a small modification of the coordinated program, a considerable amount of labor is required to debug and the test the program. For these reasons, it is desirable to provide a multi vendor environment where the user can construct the factory or office automation system regardless of the operation system used in his/her computer.

SUMMARY OF THE INVENTION

Therefore, it is a main object of the invention to provide an information managing apparatus which can provide a multivendor environment where the user can prepare programs, independent of the operating system (OS) used with his/her computer, for operating computer terminals and working robots so as to construct an factory or office automation system.

There is provided, in accordance with the invention, an information managing apparatus which comprises memory means for storing a single or plural application kits including no decision process and no data storage process. The application kits are defined only by an execution element routine. A software kit interface is provided for constructing the application kits independently of hardware and operating system. The software kit interface includes a library group for storing and processing a flow of the constructed application kits. The information managing apparatus also includes a BASE for integrally managing temporary storage and process of information shared by the application kits, an operating system interface for supplying a function group to operate the application kits and the BASE while completely separating the application kits from the hardware and the operating system, and an application program interface for operating with the software kit interface and the application program interface to provide coordination with the application kits with no modification of the memory means storing a working sequence operable only with a specified operation system.

In another aspect of the invention, there is provided an information managing apparatus for executing a plurality of basic programs each of which is arranged to perform a basic process in a desired sequence so as to perform a predetermined process and for executing an existing program usable in a type of computer to perform a predetermined process. The information managing apparatus comprises memory means for storing a library used in linking a plurality of basic programs prepared for the predetermined process with the existing program or a library used in causing a desired processing device to perform a process according to the existing program, and converting means for producing link information between the existing program and the basic programs with reference to the libraries stored in the memory means or link information used in causing the desired processing device to perform the process according to the existing program with reference to the libraries stored in the memory means.

In still another aspect of the invention, there is provided an information managing apparatus for executing a plurality of basic programs each of which is arranged to perform a basic process in a desired sequence so as to perform a predetermined process. The information managing apparatus comprises control information producing means for producing information on the execution timing of the basic programs prepared for realizing the predetermined process and information used to control data transfer between the basic programs, execution timing control means for starting and stopping the execution of the basic programs based upon the execution timing related information produced by the control information producing means, and data transfer control means for controlling data transfer between the basic programs based upon the data transfer related information produced by the control information producing means.

BRIEF DESCRIPTION OF THE DRAWINGS

This invention will be described in greater detail by reference to the following description taken in connection with the accompanying drawings, in which:

FIG. 4 is a diagram showing a displayed image showing the results obtained from oil/water amount measurements;

FIG. 13 is a diagram showing one example of kit data linkage table;

FIG. 14 is a diagram showing one example of kit start/stop management table;

DETAILED DESCRIPTION OF THE INVENTION

Figure 1:
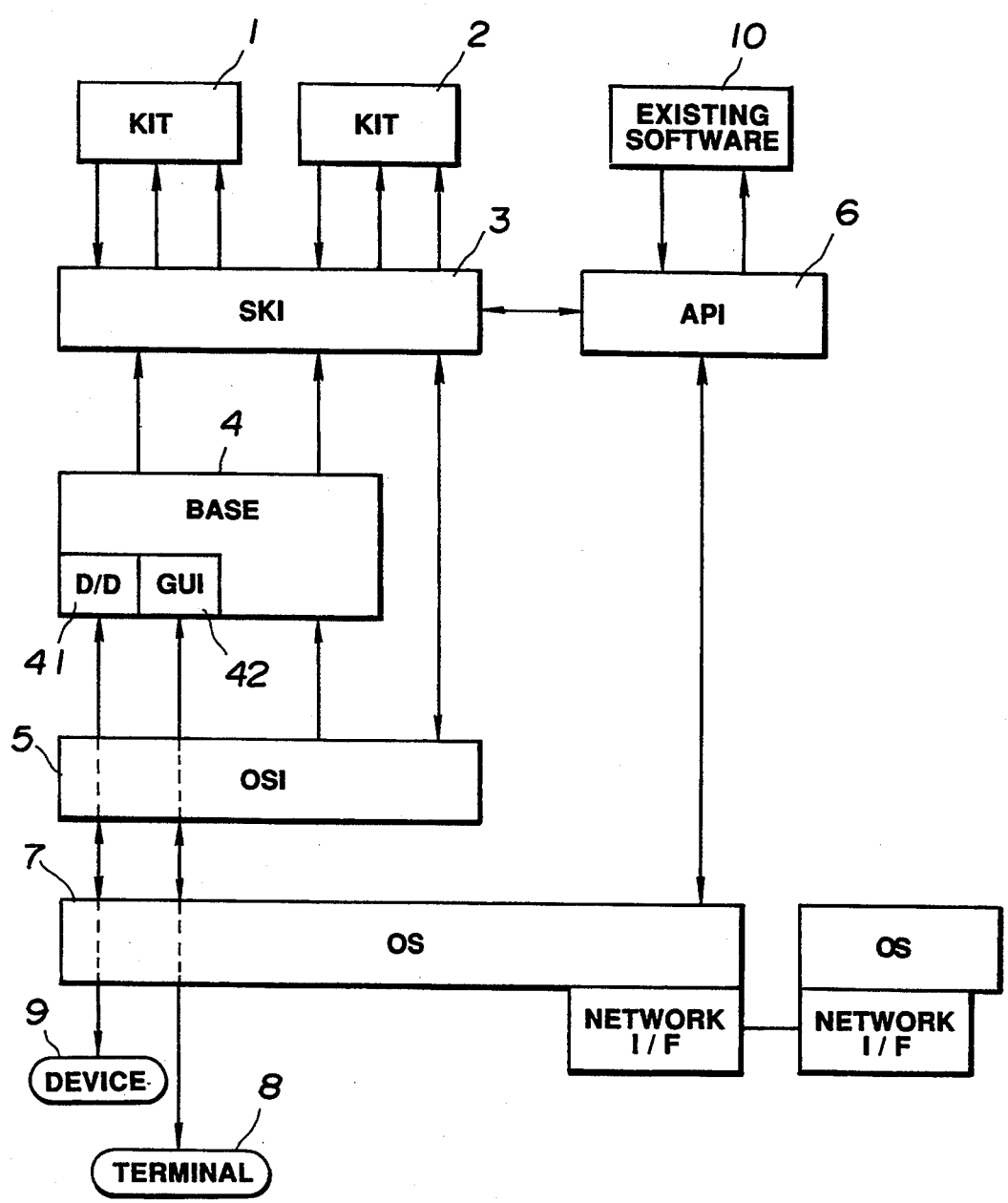
FIG. 1 is a schematic block diagram showing one embodiment of an information managing apparatus made in accordance with the invention.

With reference to the drawings and in particular to FIG. 1, there is shown a schematic block diagram of an information managing apparatus embodying the present invention. The information managing apparatus includes memories for storing a plurality of (two in the shown case) application kits 1 and 2, respectively. Each of the application kits includes no decision process and no information storing process and it is defined only by an executing element routine. The application kit is constructed by a processing module having a single function. The application kits can operate with functions transferred from a software kit interface (SKI) 3 without direct reference to external functions. The user of the information managing apparatus of the invention can select and link a desired number of appropriate application kits to realize a desired process or work. This selected application kit linkage Will be referred to as data flow diagram (DFD).

Figure 2:
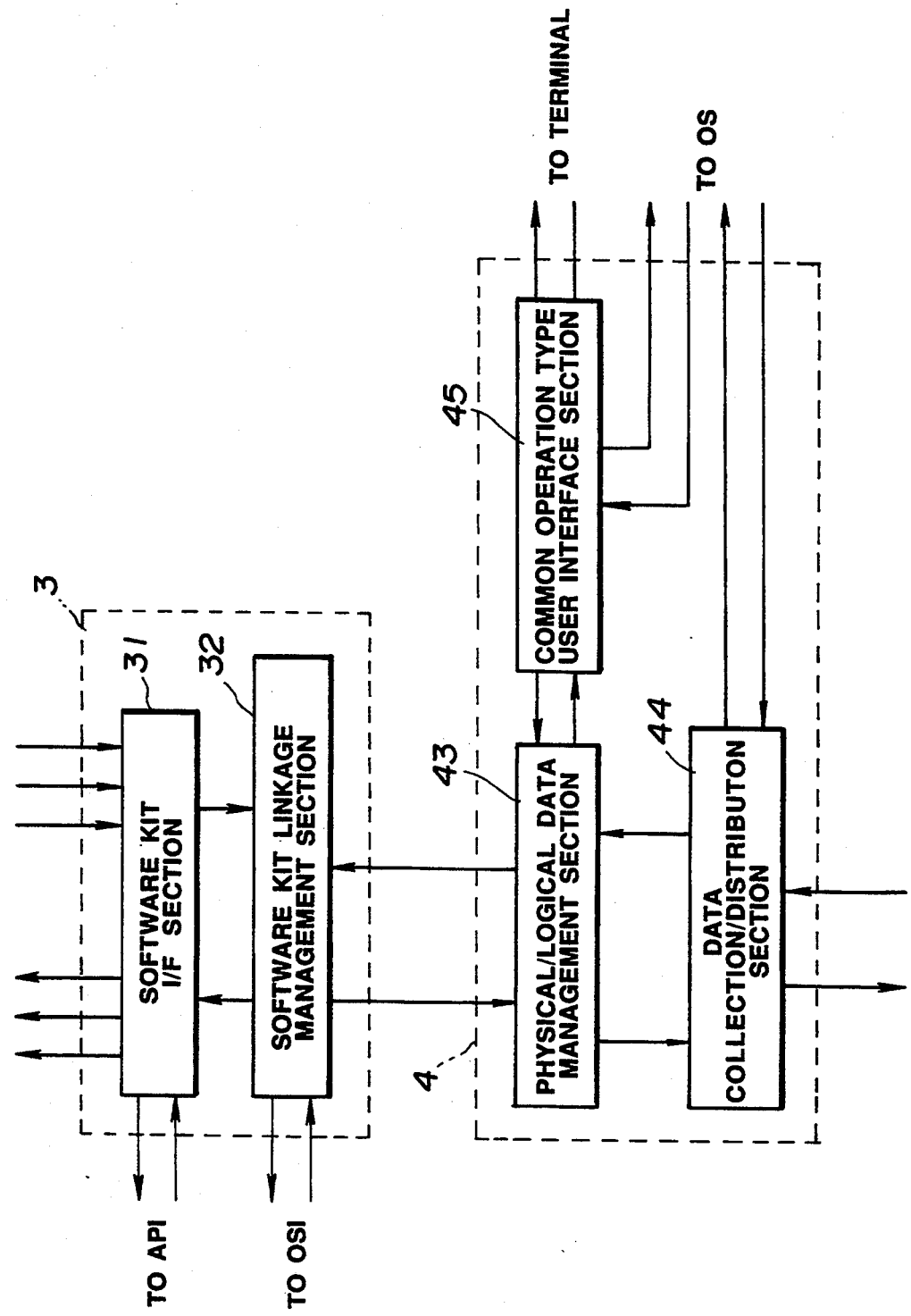
FIG. 2 is a schematic block diagram showing the detailed arrangements of the software kit interface (SKI) and the BASE section used in the information managing apparatus of FIG. 1.

The software kit interface (SKI) 3 operate the software and the application kits independently of the hardware and the operating system (OS) used with the hardware. The software kit interface (SKI) 3 includes a library group used in combining the application kits to construct a specified program and executing the constructed program. For this purpose, the software kit interface (SKI) 3 includes a software kit interface (I/F) section 31 and a software kit linkage management section 32, as shown in FIG. 2. The software kit interface section 31 controls the standard interface with the operating system (OS) and also with a BASE section 4. The software kit interface section 32 have functions including:

(1) OS Interface Function

An operating system interface function is provided to an application kit in response to a call from the application kit.

(2) BASE Interface Function

The BASE Interface function includes writing/reading the tag name of point data, writting/reading the tag name of a point database, providing an input/output interface, alarming, reading the present time, and reading tables.

The software kit linkage management section 32 provides a sequential message/data linkage regardless of the computer node. In more detail, the software kit linkage managing section 32 has functions including:

(1) DFD linkage Function

Selected application kits are linked in a sequence according to the condition set in a data flow diagram (DFD) form.

(2) Linked Data Forming Function

Data linked between the application kits are registered with a tag name. According to the tag name, data are formed automatically.

(3) Network Managing Function

A network control is made during a point data reading/writing operation for different nodes or during aa application kit linking operation.

(4) Optimum Message Selecting Function

A message type is selected automatically during communication between nodes or communication between the application kits in a node.

The BASE section 4 performs integrated management for the temporary storage and process of the information shared by the applications. The BASE section 4 has an application kit integrating function of linking the data of the application kits formed in the software kit interface (SKI) 3, controlling the operation command for the application kits and the synchronization between the application kits, and performing sequence management of the application kit operation. The BASE section 4 also has a device data managing function (device driver) of performing management of the operations of a terminal 8 and various devices 9 connected thereto, converting the physical information (data stored at specified addresses within the devices) into logical information (data acceptable with a tag name) on the information managing apparatus of the invention, and managing the configured data. Furthermore, the BASE section 4 has an image operation/formation integrating function having an interface with the terminal and a tool GUI (graphic user interface) for image display condition management and image formation. If necessary, the BASE section 4 may have an alarming function and other time managing functions. This section permits the user to make a desired processing work.

As shown in FIG. 2, the BASE section 4 includes a physical/logical data management section 43, an information collection/distribution section 44, and a common operation type user interface section 45. The information collection/distribution section 44 makes communication with the devices connected thereto to collect the data from the devices and/or distribute the data fed thereto from the application kits. The information collection/distribution section has the following functions:

(1) Device Communication Function

A function, as a device communication driver (DCD), of performing data communication between a plurality of devices in a protocol regulated for the devices.

(2) Device Communication Driver (DCD) Operation

A function of selecting an appropriate device communication driver from "device types" registered in a "device table" and operating the selected device communication driver.

(3) Data Collection

A function of operating the device communication driver (DCD) according to the collection contents and collection types registered in the "point data table" to collect the device data. Collection type; cyclic/condition event/change event/request event.

(4) Data Distribution

A function of operating the device communication driver (DCD) according to the distribution contents and distribution types registered in the "point data table" to distribute the device data. Distribution type; cyclic/condition event/change event/request event.

(5) Device Access Service

1) A function of automatically optimizing the collection data amount during event type collection.
2) A function of making a protection during device connection/disconnection.
3) A function of optimizing the serial operation timing of the device communication driver (DCD).
4) A function of making a writing protection for each data.
5) A function of checking the range of the collection and distribution data.
6) A function of providing a support tool for development of a new DCD.

The physical/logical data management section 43 converts the physical data developed on the address of each of the terminals into logical data; that is, tag name provided point data usable in the application kits. For example, the physical/logical data management section has the following functions:

(1) Configured Tag Access

A function of assigning a tag name (point data table) to each of the physical data collected from the devices so as to permit tag access to individual data or data in each configuration unit.

(2) Assumed Point Data Management

A function of forming an assumed point data area, performing fundamental calculations (+, −, ×, ÷, square root, square, etc.) and logical calculations (AND, OR, XOR, etc.), and managing data.

(3) Point Database (PDB) Linkage

A function of R/W control of the point data in connection with the database in a form registered in a "PDB format table" at a timing of [cyclic/condition event/change event/request event].

(4) Point Database Form Modification

A function of making an automatic modification for the old format after the "PDB format table" is modified.

(5) Point Database Retrieval

A function of retrieving the content of the date in the format according to set conditions and filing the retrieved content.

(6) Point Database Access

A function of making an access to the D/B according to a file name-configured tag specification.

The common operation type user interface section 45 controls the terminal, the keyboard, the display (image display) and the printer as the common users for the application software kits. For example, the common operation type user interface section has the following functions:

(1) Input/Output Form Formation (GED)

A function, as a graphic editor, of forming an input/output form in a graphic form.

(2) Data Assignment Registration

(GED Setting Table)

A function of registering the content to be displayed in an input/output form produced in the GED.

(3) Linkage with Application Kit (UIC)

A function of inputting/outputting the GED input/output data from the application kits to the physical device (terminal, printer).

(4) Table Management (Table Database)

A function of managing all of the tables used in the system. The UIC is used for data setting.

(5) GED Form Management (GED-D/B)

A function of common management for the input/output form produced in the GED (Form Integral Management for Different Nodes).

(6) Device Inherent Image Management

A function of managing the information used in relating the GED-B/B to the device inherent image.

(7) Linkage Management with Platform Data Managing Section

A function of controlling the data transfer in connection with the data managing function of the platform.

In order to operate the application kits 1 and 2 and the BASE section 4 while completely separating from the hardware and the operating system (OS) 7 used with the hardware, an operating system interface (OSI) 5 is provided to supply a function group. The operating system (OS) 7 depends on the type of the hardware used for operating the various devices included in the information managing apparatus of the invention. The operating system interface (OSI) 5 converts the functions used in the operating system (OS) 7 and the processing functions dependent on the operating system (OS) 7 into functions usable in the information managing apparatus of the invention. For this purpose, the operating system interface (OSI) 5 has an OS library. This OS library is used in converting the instructions of the operating system (OS) 7 into the corresponding functions usable in the information managing apparatus of the invention. The OS library is taken in the form of a table which specifies instructions (instruction formats) used in the information managing apparatus of the invention in correspondence with the respective instructions (instruction formats) used with the operating system (OS) 7. Upon the receipt of an execution instruction inputted through the terminal, the operating system interface (OSI) 5 converts the received execution instruction into a corresponding instruction useable in the information managing apparatus of the invention while referring to the OS library. A result is obtained when this instruction is executed in the information managing apparatus of the invention. The operating system interface (OSI) 5 converts this result into a form usable in the hardware. It is, therefore, possible to execute the program constructed by the application kits to perform a desired work regardless of the computer type difference.

The operating system interface (OSI) 5 may be arranged to have functions for providing a supplement of the functions used in the hardware dependent operating system (OS) 7. Normally, the functions and processing instructions used in the hardware dependent operating system (OS) 7 are inherent in the hardware and the operating system (OS) 7 and they do not include certain functions and instructions usable in another type of computer. This is inconvenient for the user of computers of different types. In order to avoid the inconvenience, appropriate functions and instructions are added.

An application program interface (API) 6 is provided for converting the execution instructions of the application program operable only with a specified operating system (OS) into corresponding instructions usable in the information managing apparatus of the invention with reference to the OS library. By the functions of the operating system interface (OSI) 5 and the application program interface (API) 6, application programs can be executed in different types of computer without any special attention to the operating system (OS) 7. The operating system interface (OSI) 5 and the application program interface (API) 6 are not arranged to make these conversions in such a manner to form a program merely by converting a program comprised of execution instructions of a certain operating system (OS) into the instruction formats usable in the information managing apparatus of the invention. Rather, these interfaces 5 and 6 are arranged to specify only the execution instructions of the instructions inputted from the terminal or produced during execution of the application program and operate them in the information managing apparatus of the invention. It is, therefore, possible to execute a part of instructions in an application program. The data flow diagram (DFD) may be used to combine this instruction part with the application kits 1 and 2.

Figure 3:
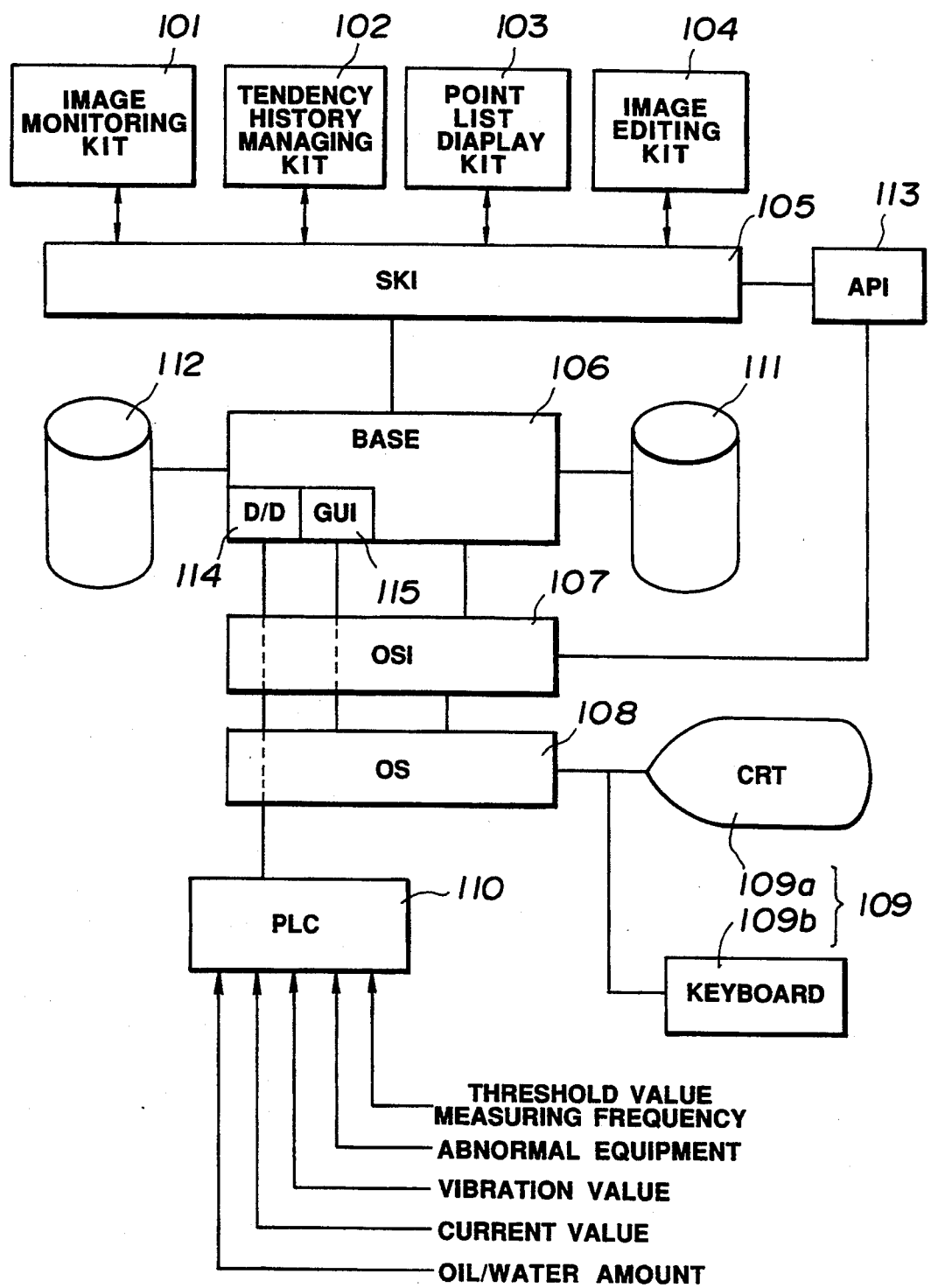
FIG. 3 is a schematic block diagram showing a modified form of the information managing apparatus.

Referring to FIG. 3, the invention will be described further in greater detail. It is now assumed that the information managing apparatus of the invention is used in the production support system provided in an engine production line for equipment management based upon the equipment information inputted through a programmable controller (PLC). The hardware used in the information managing apparatus may be a work station or computer made by DEC, VAX, IBM or other makers. The operating system interface (OSI) 107 of the invention is used with the operating system (OS) 108 specified for the hardware. A BASE 106, a software kit interface (SKI) 105, an application program interface (API) 113, and a plurality of application kits 101, 102, 103 and 104 are incorporated along with the operating system interface (OSI) 107. A programmable controller (PLC) 110 is connected to the information managing apparatus. The programmable controller (PLC) 110 receives information from the equipments installed in the engine production line. The information includes a measured oil/water amount value, a measured current value, a measured vibration value, an equipment abnormal condition, a measuring frequency value, and threshold values.

Application kits necessary for the equipment management are selected through the terminal connected to the information managing apparatus and connected by the data flow diagram (DFD). In this case, the necessary application kits include the image condition monitoring kit 101, the tendency history management kit 102, the point list display kit 103 and the image editing kit 104. The selected application kits are linked by the software kit linkage section of the software kit interface (SKI) 105 on a command from the user.

First of all, the type of the necessary data is inputted through the terminal 109. At the same time, the mode in which the data are displayed is set to provide a desired graphic display (table, figure). The inputted command is read into the operating system (OS) 108 of the hardware and an instruction dependent on the operating system (OS) 108 is produced. The operating system interface (OSI) 107 converts this instruction into an instruction format usable in the information managing apparatus of the invention. The database 111 stores the display mode and the necessary data type. A processing instruction is fed to the software kit interface (SKI) 105 along with an appropriate operation timing set for the application kits combined to perform the process. As a result, the image editing kit 104 is operated to set the image display mode. According to the performed process, the image display mode is transferred from the software kit I/F section of the software kit interface (SKI) 104 to the BASE 106. The BASE 106 judges the result of the execution and operates the graphic user interface (GUI) 115 to display a desired image. When a command is produced to execute the equipment management after the necessary data and the display mode for the data are set, the BASE 106 produces a command to operate the application kits necessary for the process to collect necessary data. The software kit I/F of the software kit interface (SKI) 105 integrally selects the data required for the respective application kits and produces a data request causing the BASE 106 to collect the necessary data through the device driver (D/D) 114 from the programmable controller (PLC) 110. The BASE 106 classifies and provides the collected data with tag names. The classified data are stored in the database 112. During the data collection, the data transferred from the programmable control let (PLC) 110 are developed, as physical data, on the address specified by the operating system (OS) 108. The logic/physical data management section of the operating system interface (OS) 107 converts the physical data developed on the address of the operating system (OS) 108 into logical data (with tag names assigned by the BASE 106). The process for the equipment management continues. After the necessary analysis of the collected data, the BASE 106 produce an execution instruction to the tendency history management kit 102 for performing a process required for the analysis. The execution instruction to execute the tendency history management kit 102 is fed through the software kit interface (SKI) 105. When the application kit 102 is executed a request for the data necessary for the data analysis is fed from the software kit interface (SKI) 105 to the BASE 106. The BASE 106 responds to the request by reading the data from the databases 111 and 112. The BASE 106 calls the operating system interface (OSI) 107 to execute the functions necessary for the process.

The application kits 104 and 101 are executed to display the result of the execution on the cathode ray tube (CRT) 109a of the terminal 109. For this purpose, the BASE 106 produces an execution instruction. FIG. 4 shows a displayed image when the amount of the oil in an equipment provided in the line is monitored.

The information managing apparatus of the invention may be used in the production support system provided in the engine production line to perform equipment management based upon equipment information fed from a programmable controller (PLC). The invention will be described in connection with equipment vibration history management.

Figure 5:
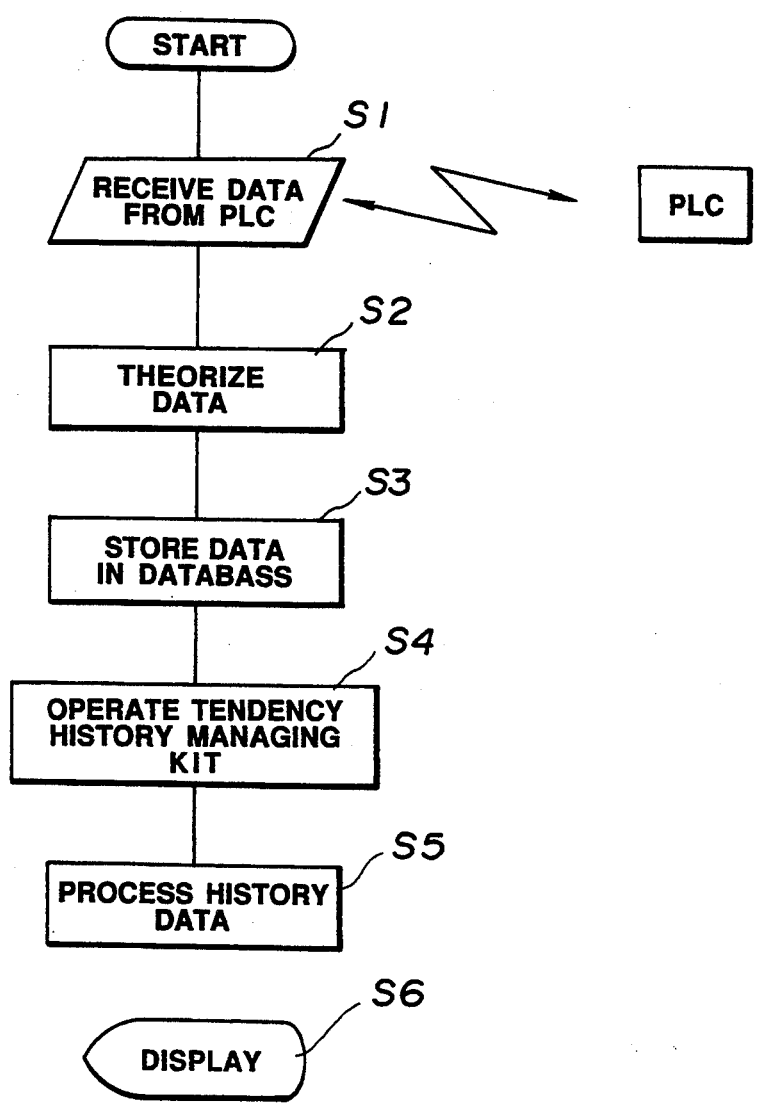
FIG. 5 is a flow diagram used in explaining the processes made for vibration history management.
Figure 6:
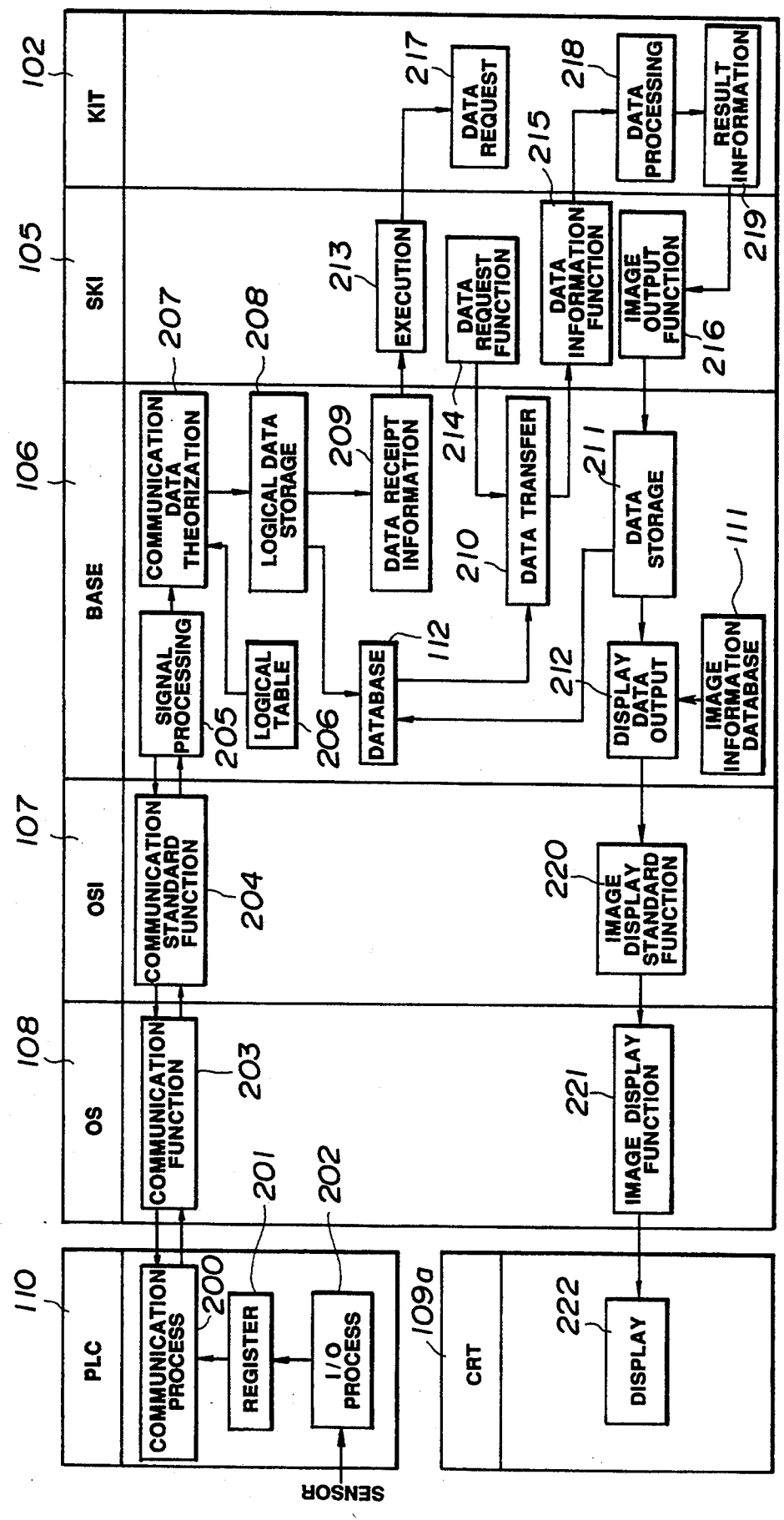
FIG. 6 is a diagram used in explaining various processes made in the information managing apparatus of FIG. 3.

FIG. 5 is a flow diagram used in explaining the processes made for vibration history management. FIG. 6 is a schematic block diagram showing the processes made in the various portions of the information managing apparatus of the invention.

Figure 7:
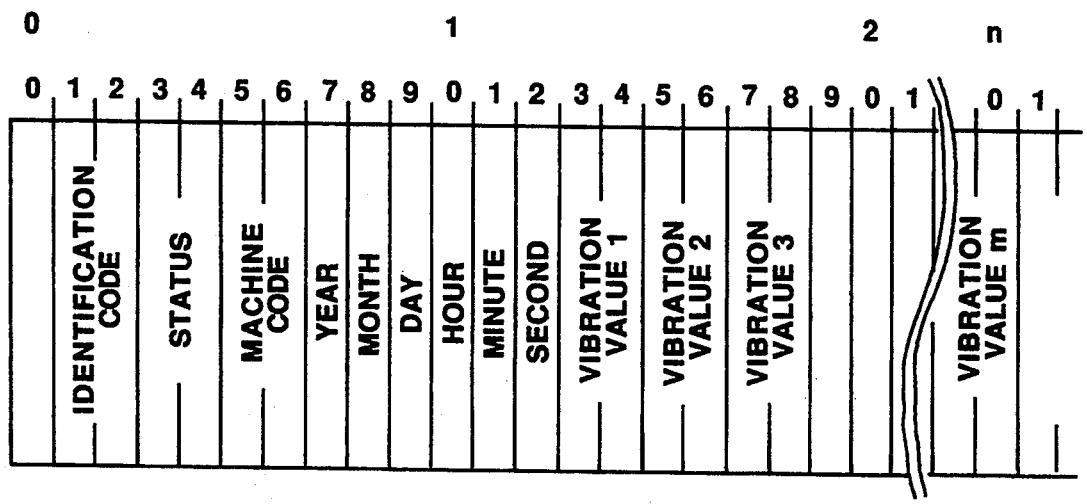
FIG. 7 is a diagram showing data stored in the PLC register.

First of all, the programmable controller PLC 110 makes an I/O process to collect equipment vibration information (data) through sensors and stores the collected data in the register 201. FIG. 7 shows the form in which the collected data. At the step S1, the device driver (D/D) 114, which is included in the BASE 106 of the information managing apparatus of the invention, utilizes the communication logic table 206 provided in the programmable controller (PLC) 110 and the communication standard function provided in the operating system interface (OSI) 107 to perform a signal process 205 so as to obtain data in such a form as shown in FIG. 7. The operating system interface (OSI) has a communication function inherent in the hardware used in the information managing apparatus of the invention. The operating system interface (OSI) 107 has a communication standard function, for example, as shown in TABLE 1. The communication standard function is converted into the communication function 203 of the operating system (OS) 108 for communication with the programmable controller (PLC).

TABLE 1

COMMUNICATION STANDARD FUNCTION OF OSI
CALL RCV (LN, DN, FN, RD, CNT, RET)
WHERE LN: CIRCUIT ON
  DN: RECEIVED DATA ON
  FN: RECEIVED FORMAT
  RD: RECEIVED DATA STORAGE AREA
  CNT: RECEIVED DATA NUMBER
  RET: RETURN DATA (0: NORMAL, 1-9: ABNORMAL)
CONVERSION INTO OS COMMUNICATION FUNCTION
OS COMMUNICATION FUNCTION
CALL CARCV (code, flg, time, leng, rtcd)
WHERE
  code: CODE CONVERSION
  flg: TYPE
  time: MONITORING TIME (SECOND)
  leng: DATA LENGTH
  rtcd: RETURN DATA At the step S2, the received data are used in the BASE 106 for a data theorization process 207 with the point name specified in the logical table 206, as shown in TABLE 2.

TABLE 2

| POINT NAME | SIZE | PLC NO. | REGISTER ADDRESS |
| --- | --- | --- | --- |
| YEAR | 1 | NO. 1 | 007 |
| MONTH | 1 | NO. 1 | 008 |
| DAY | 1 | NO. 1 | 009 |
| HOUR | 1 | NO. 1 | 010 |
| MINUTE | 1 | NO. 1 | 011 |
| SECOND | 1 | NO. 1 | 012 |
| VIBRATION VALUE 1 | 2 | NO. 1 | 013 |
| VIBRATION VALUE 2 | 2 | NO. 1 | 014 |
| VIBRATION VALUE 3 | 2 | NO. 1 | 015 |
| . | . | . | . |
| . | . | . | . |
| VIBRATION VALUE m | 2 | NO. 1 | n − 1 | where m is the last vibration value data and n is the last value of the stored addresses at which the last vibration data are stored.

Figure 8:
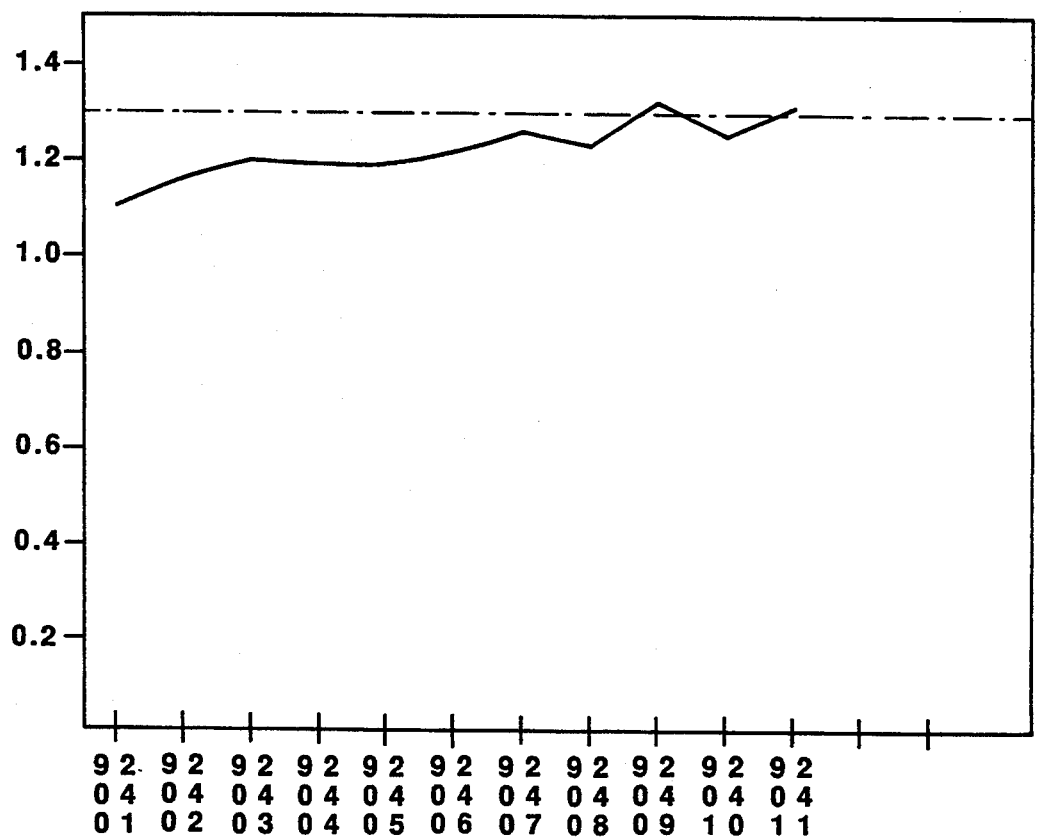
FIG. 8 is a diagram showing the results obtained from the processes made for vibration value history management.

At the step S3, the BASE 106 stores the logical data in the database 112 through a logical data storage process 208. The BASE 106 informs the software kit interface (SKI) 105 through a data receipt completion informing process 209 that the vibration data receipt has been completed. At the step S4, the software kit interface (SKI) 105 triggers the message of the data receipt completion informing process 209 to operate the tendency history management kit 102 through an operation process 213. The tendency history management kit 102 requests the necessary data with the point name through a data request process 217. The software kit interface (SKI) 105 receives the data request 217 from the tendency history management kit 102 and it produces a data request, as a data request function 214, to the BASE 106. The BASE 106 reads the data related to the requested logical name from the database 112 and transfers the read data to the SKI 105 through a data transfer process 210. The software kit interface (SKI) 105 transfers the transferred data to the kit through a data information function 215. At the step S5, the tendency management kit 102 collects time series vibration value data through a data process 218 to perform a data multiplying process. The tendency history management kit 102 transfers the result obtained from the process to the software kit interface (SKI) 105 and informs through a result information 219 that the process has been completed. The software kit interface (SKI) 105 judges the part to which the result of the process is to be informed and it informs the BASE 106 the result of the process as an image output function 216 for image display. The BASE 106 stores the received result of the process in the database 112 through data storage 211. The graphic user interface (GUI) 115 reads the image data from the database 111 and transfers the read image data to the operating system interface (OSI) 107 as a display image data output 212. At the step S6, the display image data output performs displaying 222 of the result on the CRT 109 through the image display standard function 220 of the operating system interface (OSI) 106 by the image display function 221 of the operating system (OS) 108 inherent in the hardware. The displayed result is shown in FIG. 8.

Figure 9:
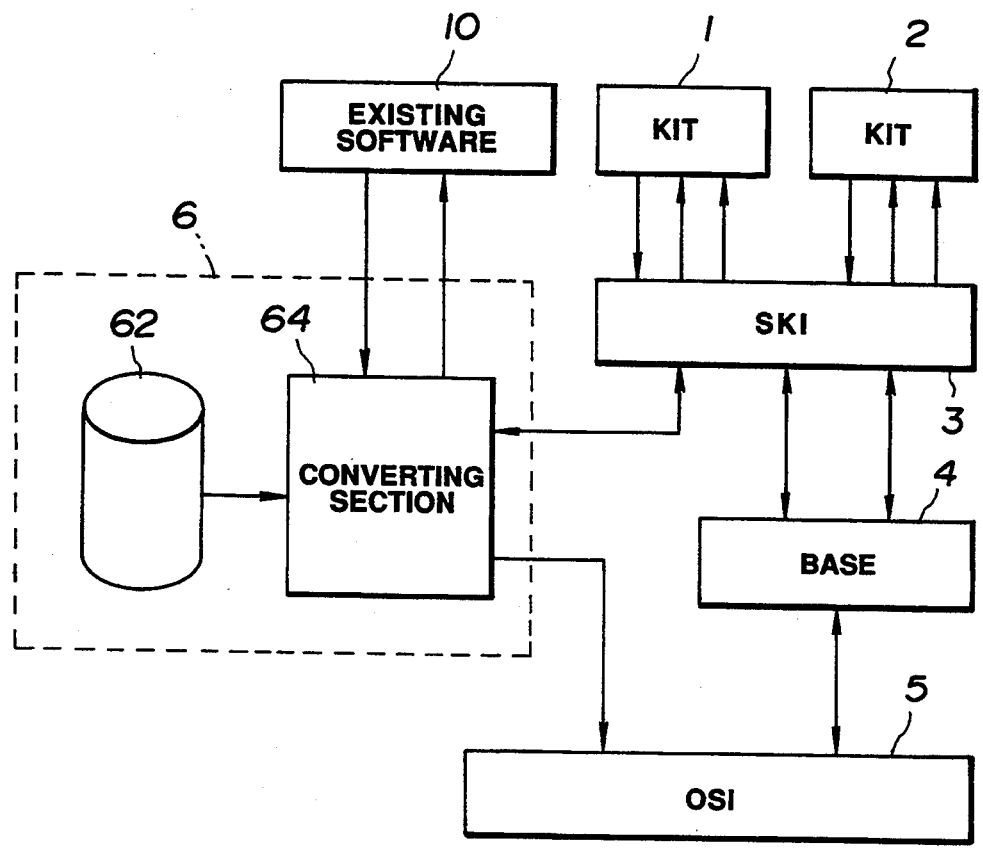
FIG. 9 is a schematic block diagram showing the detailed arrangement of the application program interface (API) used in the information managing apparatus of FIG. 1.

Referring to FIG. 9, the application program interface (API) 6 will be described further. The application program interface (API) 6 includes a memory in the form of a file 62 for storing a library used in linking the existing software 10 with the application its and a library used in linking the existing software 10 with the operating system interface (OSI) 5. For example, the existing software 10 may include programs related to the number of the kinds of the vendors used in the enterprise. These programs are constructed to operate with a specified operating system (OS) and they cannot normally be used with another type of operating System (OS). The file 62 also stores libraries corresponding to the respective existing programs for executing them with different operating systems. For example, to link five existing programs A, B, C, D and E with application kits, the file 62 may store libraries for the respective linkages. For linkage with the operating system interface (OSI) 5, the file 62 may store libraries for the programs A, B, C, D and E.

The application program interface (API) 6 also includes a converting section 64 which refers to the libraries stored in the file 62 for producing conversion information for linkage of the existing software 10 with the application kits and conversion information for linkage of the existing software 10 with the operating system interface (OSI) 5. Assuming that a certain instruction (a) of the existing software (A) corresponds to an instruction (a') in the operating system interface (OSI) 5, the instruction (a) is converted into the instruction (a') with reference to the library for the software (A) stored in the file 62. When the operating system interface (OSI) 5 has no instruction corresponding to a command (b) of the software (A), the converting section 64 converts the instruction into a form usable in the operating system interface (OSI) 5. For example, when an instruction for a multiplication is produced in the existing software while the operating system interface (OSI) 5 includes instructions for additions only, the multiplication instruction is replaced with addition instructions to realize the instructed multiplication in a dummy treatment (of processing a multiplication 3×3 as an addition 3+3+3). When an index sequential composing file is formed in the existing software and the operating system interface (OSI) 5 has control instructions only for a sequential composing file, the operating system interface (OSI) 5 has the instruction for the index sequential composing, that is, an instruction for access to a desired record with a direct index and processes the instruction in such a manner that it is replaced with a sequential composing instruction. Assuming that a record name "ABC" is stored in the fourth record in the index sequential composing file, the fourth record is taken after sequential accesses to the four records.

Figure 10:
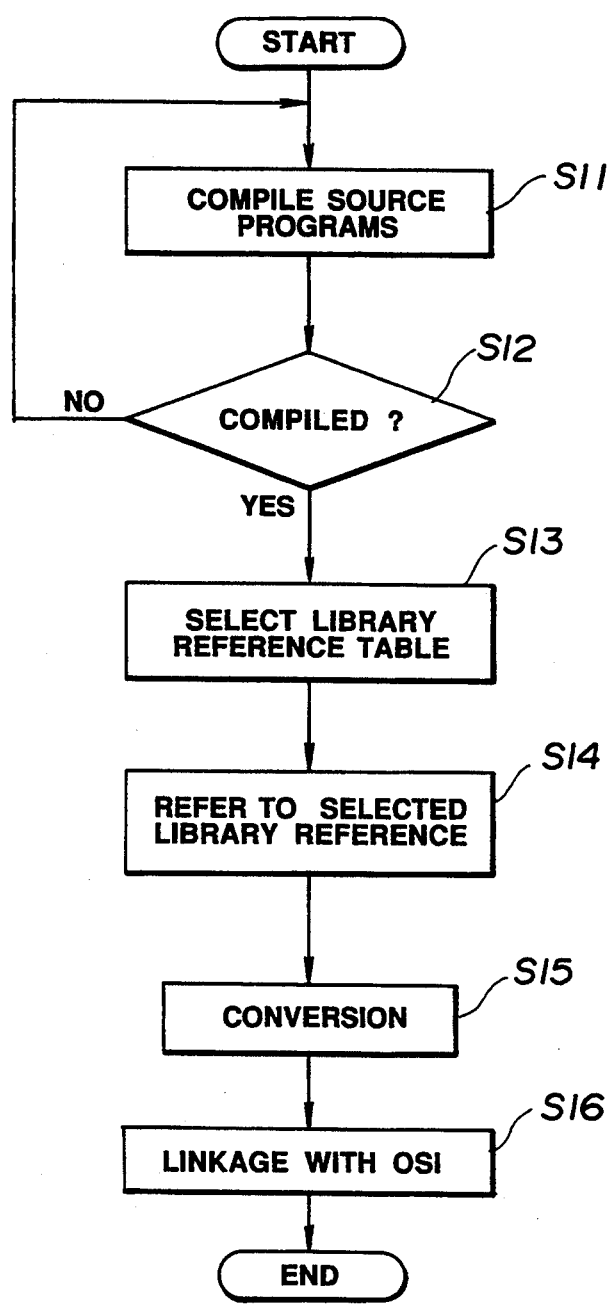
FIG. 10 is a flow diagram used in explaining the processes made in the application program interface (API)

FIG. 10 is a flow diagram used in explaining the processes made in the application program interface (API) 6. First of all, at the step S11, the converting section 64 compiles the existing software to convert the source programs into machine language level programs; that is, relocatable objects. At the step S12, a determination is made as to whether or not the source programs have been compiled. Upon completion of the compiling operation, at the step S13, the converting section 64 selects a library corresponding to the compiled programs from the file 62. The converting section 64 refers to the selected library at the step S14 and converts the software into information common for the software kit interface (SKI) 3 and the operating system interface (OSI) 5. After the common information has been produced, at the step S16, a linkage with the operating system interface (OSI) 5 is made with reference to the library included in the operating system interface (OSI) 5 to produce an instruction usable in the devices connected to the operating system interface (OSI) 5.

The converting section 64 converts the existing software into information usable for the application kits, that is, into information that can be recognized in the software kit interface (SKI) 3 and the operating system interface (OSI) 5. It is, therefore, possible to operate the existing software and to transfer data to and from the existing software.

Figure 11:
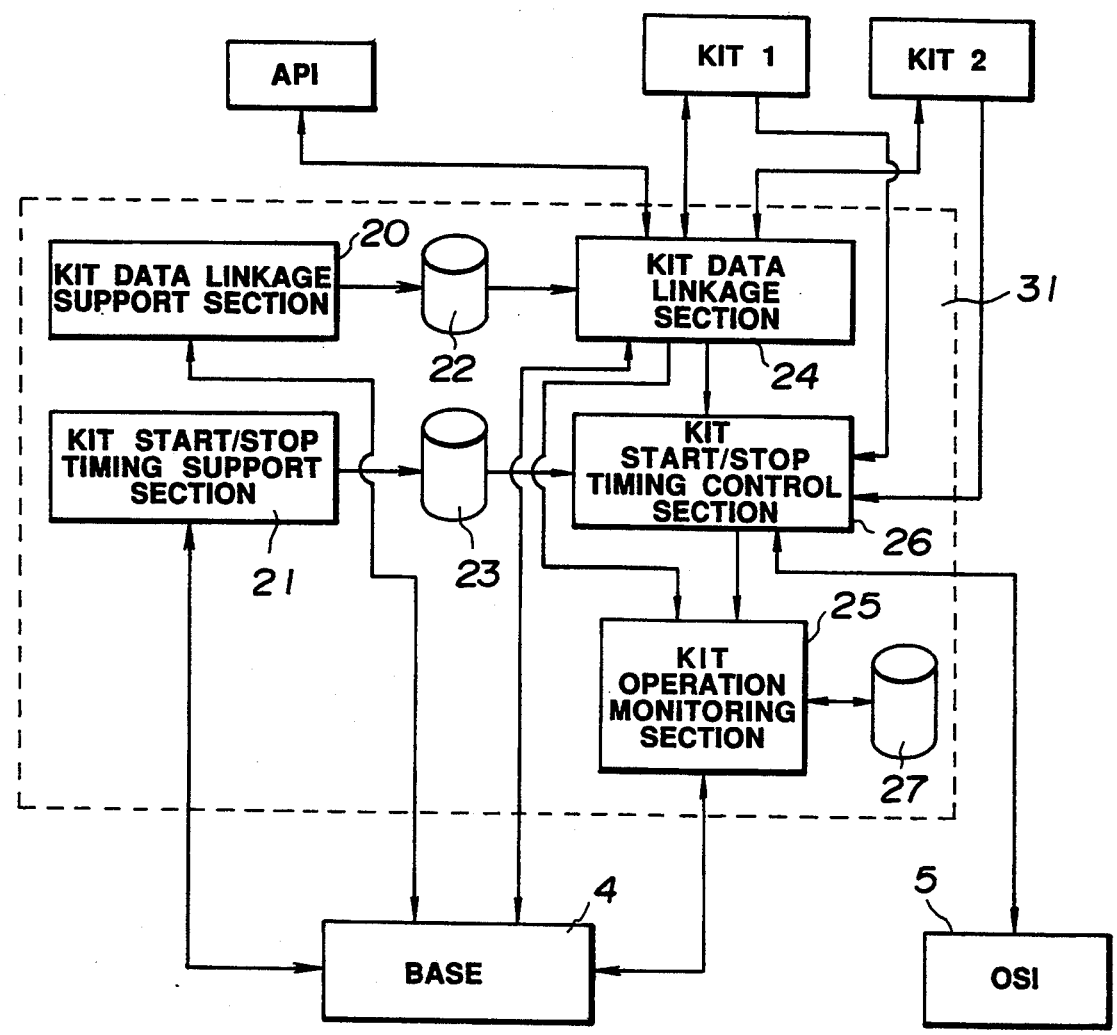
FIG. 11 is a schematic block diagram showing the detailed arrangement of the software kit interface section of FIG. 2.

Referring to FIG. 11, the software kit interface (SKI) 3 will be described further. In this case, the information managing apparatus is arranged to provide a multivendor environment which permits an access from any of the various types of computer made by different makers and provided in the factory and to permit an ordinary skilled person to produce a program in a very short time with ease when a predetermined process is inhibited.

The software kit linkage management section 31 is shown in FIG. 11 as including a kit data linkage support section 20, a kit start/stop timing support section 21, a kit data linkage table 22, a kit start/stop management table 23, a kit operation monitoring section 25, a kit start/stop timing control section 26, and a memory section 27. The kit data linkage support section 20 automatically produces data for controlling the data transfer between the basic programs (referred hereinafter to as application kits) based upon a linkage command produced by the operator of the basic programs which constitute a certain processing program. Similarly, the kit start/stop timing support section 21 automatically produces data for the timing of operation and stoppage of the respective basic programs. The data linkage data produced by the kit data linkage support section 20 are stored in the kit data linkage table 22. The kit start/stop data produced by the kit start/stop timing support section 21 are stored in the kit start/stop management table 23.

The operation of the software kit interface (SKI) 3 will be described. It is now assumed that a program is produced for obtaining production command data for a certain part based upon data on an actual output and an output in a certain place of production. First of all, the operator defines a process and input/output data for each of desired application kits. For example, the operator selects three application kits, that is, a kit for estimating an output in the main line, a kit for managing the stock and a kit for instructing the production and he/she defines the processes as a main line production sequence estimating kit, a stock managing kit and a part production instructing kit. The input of the main line production sequence kit is defined as a daily output, thrown permutation. The output of the main line production sequence kit is defined as a production permutation. Similarly, the input of the stock managing kit is defined as actual output, extracted data and the output of the stock managing kit is defined as present quantities in stock. The input of the part production instructing kit is defined as tension estimation, stock data, and the output of the part production instructing kit is defined as next production instructing data. Following this, the operator checks whether any application kit corresponding to one of the defined application kits has been registered. If a corresponding application kit exists, it is linked in the defined sequence. Otherwise, additional checks are made as to whether any application kit corresponds to the defined application kits registered in a finer level. If a corresponding application kit exists, it is linked in the defined sequence. Otherwise, an application kit of a similar pattern is selected. The selected application kit is modified into an appropriate form. The modified application kit is registered for use in producing another program.

Figure 15:
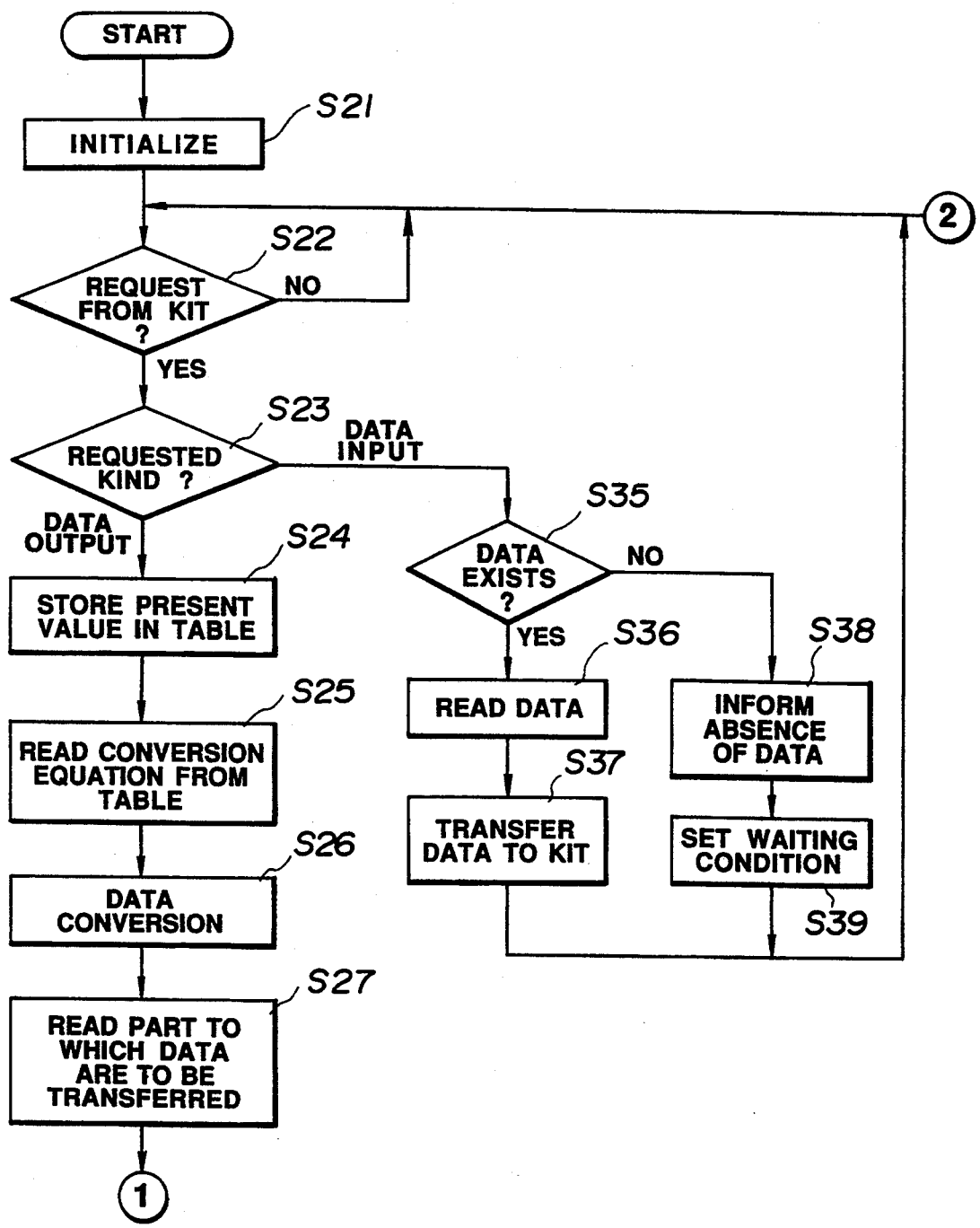
FIGS. 15 and 16 are flow diagrams used in explaining the processes made in the kit data linkage section.
Figure 16:
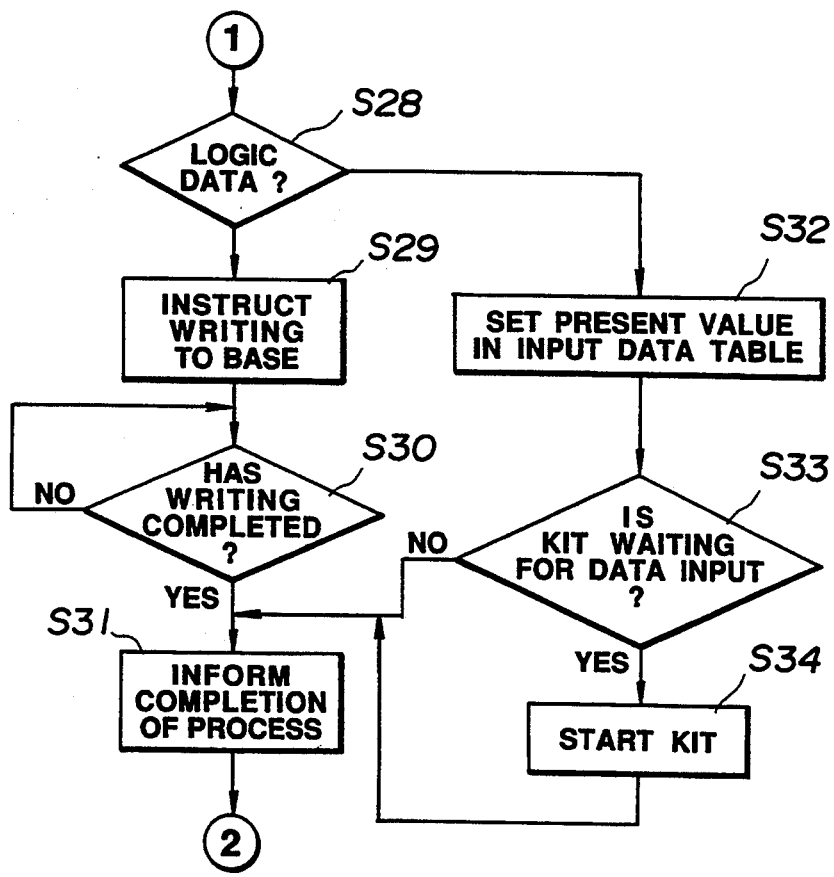

After similar processes are performed for all of the application kits, the kit data linkage support section 20 and the kit start/stop timing support section 21 automatically produce the tables as shown in FIGS. 13 and 14 based upon the data of the linked application kits and stored in the respective files. As shown in FIG. 13, the linked data are used to produce the data conversion instructing data (IN=OUT) used for converting the output, production permutation, of the main line production sequence estimating kit into the input, tension estimation, of the part production instructing kit and the data conversion instructing data (IN=OUT−YOBI) used for converting the output, present stock, of the stock managing kit into the input, stock managing, of the part production instructing kit. The produced data are stored in the kit data linkage table 22. A start/stop management table is produced in such a manner that the part production instructing kit operates when the tension estimation data are triggered and stopped when the system stoppage is triggered, as shown in FIG. 14. The data are stored in the kit start/stop management table 23. The kit data linkage section 24 communicates with the BASE 4 to control the data transfer between the illustrated kits A and B and between each of the kits and the BASE 4 according to the table stored in the kit data linkage table 22. The conditions under which the data communication made in the kit data linkage section 24 is outputted to the kit operation monitoring section 25. The kit start/stop timing control section 26 receives an operation instruction outputted from the operating system interface (OSI) 5 and controls the start/stop of the application kits connected thereto according to the table stored in the kit start/stop management table 23. When a request is produced for the tension estimation of the part production instructing kit, this kit is operated to convert the production sequence obtained as the output of the main line production sequence estimation kit into the tension estimation so as to provide data for the operation of the part production instructing kit. The kit start/stop condition of the kit start/stop timing control section 26 is outputted to the kit operation monitoring section 25. The kit operation monitoring section 25 regulates the condition of the process made in the kit data linkage section 24 and the kit start/stop timing control section 26. The kit operation monitoring section 25 stores the regulated process condition in the history data memory section 27 and makes a reproduction of the operating conditions and data transfer conditions in the respective kits. It is possible to check the cause of a trouble with ease by investigating the history. A pseudo device may be connected to provide pseudo data to the information managing apparatus for simulating certain operations. This is effective to eliminate bugs with ease. FIGS. 15 and 16 are flow diagrams explaining the processes made in the kit data linkage section 24. When the kit data linkage section 24 starts its operation, at the step S21, initialization is made to initialize all of the operations. After the initialization, at the step S22, a determination is made as to whether or not a data request is produced from any of the application kits. If no data request is produced, then the program is returned to the step S22 until a data request is received. After the receipt of a data request from an application kit, at the step S23, a determination is made as to the kind of the received data request. Assuming that the received data request is related to data output, the data are inputted and the outputted value is stored in the table (steps 23 and 24). A conversion equation is read from the table stored in the kit data linkage table 22 for converting the data into another data. Following this, the part to which the data are to be outputted is read from the table (steps S25 to S27).

Figure 12:
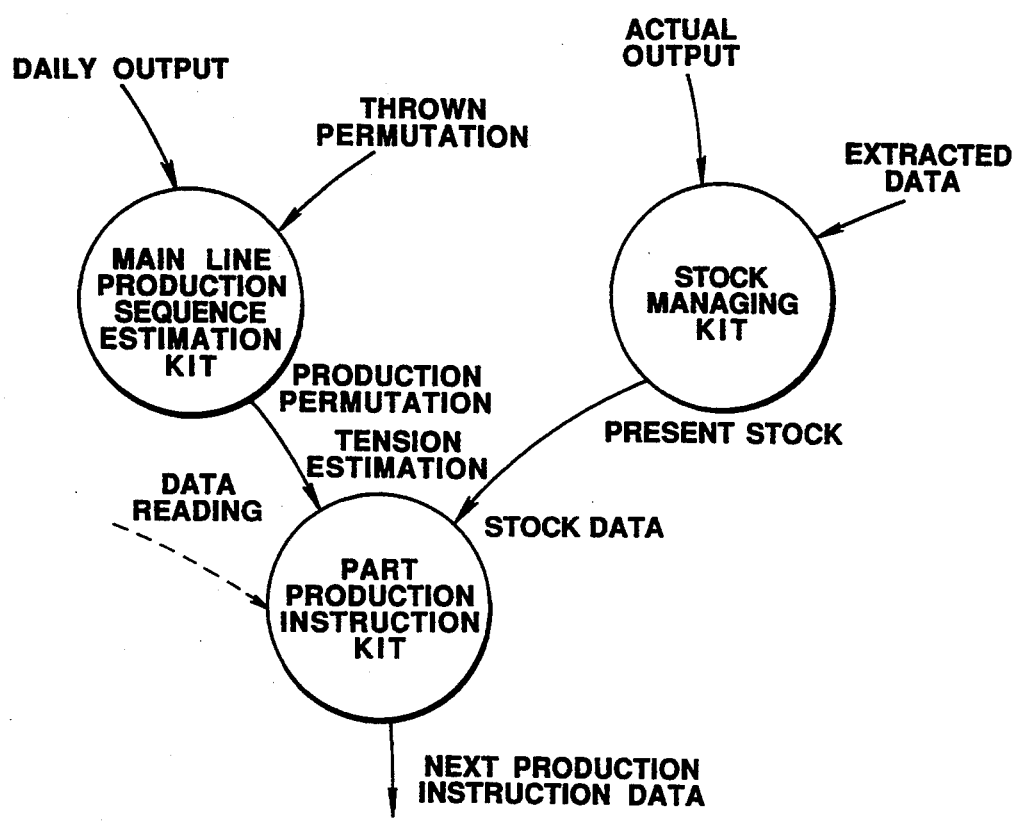
FIG. 12 is a schematic diagram used in explaining data transfer between the application kits.

The above process will be described further with reference to FIG. 12. For example, when a data output request is produced from the main line production sequence estimation kit, an IN=OUT conversion process is made to convert the output data, production permutation, into tension estimation with reference to the table of FIG. 13. The part production instructing kit which is the part to which the data are to be outputted is read.

At the step S28, a determination is made as to whether the read part to which the data are to be outputted is for writing logical data for the BASE 4 or for inputting data to a kit. If the part to which the data are to be output is for the BASE 4, then an instruction is produced to write the converted data in the BASE 4 (step S29). After the completion of the data writing process, this completion is informed and then the program is returned to the step S22 (steps S30 and S31). If the part to which the data are to be outputted is a kit, the converted data are set as the present value in the input table (step S32). If the kit is waiting for data input, then the completion of the process is informed without starting the kit (steps S33 and S34). By the above process, the data converted by the kit data linkage section 24 are inputted to the BASE 4 or a desired kit connected to the apparatus. If the received data request is related to data input, then the data to be input ted are read and transferred to the kit (steps S35 to S37). If no data exists, then it is informed that no data exists and the condition of waiting for data to be read is set in the table (steps S38 and S39).

Figure 17:
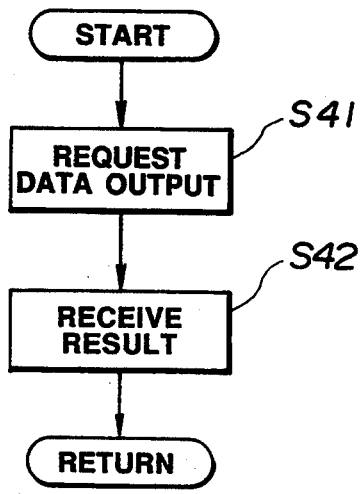
FIG. 17 is a flow diagram used in explaining the data outputting process made in the interface on the kit side.

FIG. 17 is a flow diagram used in explaining the data outputting process made in the interface on the side of the kits. At the step S41, the interface produces a data output request to the kit data linkage section 24. At the step S42, the interface receives the result such as the completion of the process. Following this, the program is returned to the main routine.

Figure 18:
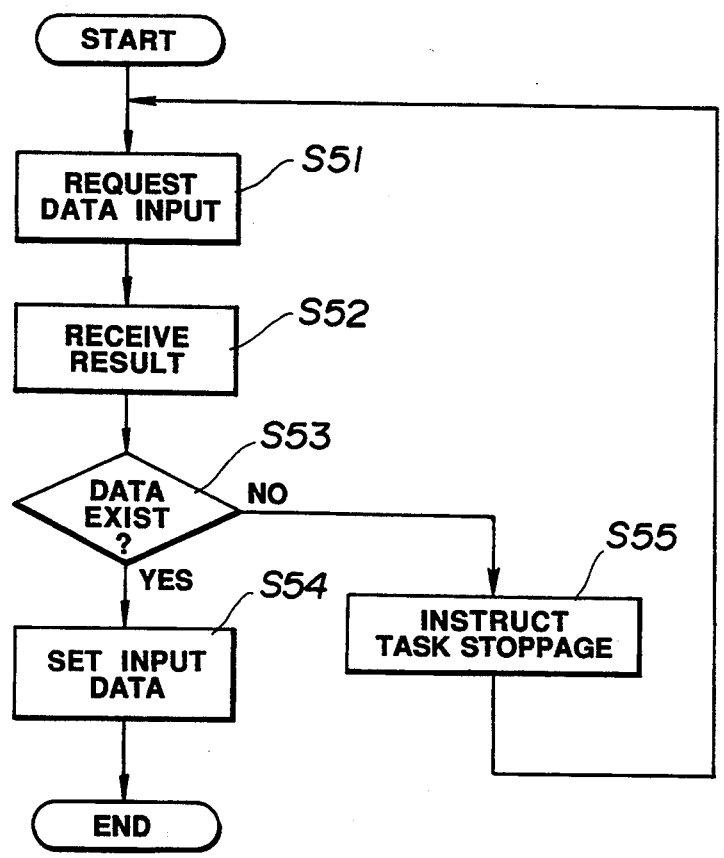
FIG. 18 is a flow diagram used in explaining the data inputting process made in the interface on the kit side.

FIG. 18 is a flow diagram used in explaining the data inputting process made in the interface on the side of the kits. At the step S51, the interface sets the data inputted from the kit data linkage section 24 when the requested data exists after it produces an data input: "request signal to the kit data linkage" section 24. At the step S52, the interface receives the result informing that no data exist. If the requested data exist, the data inputted from the kit data linkage section 24 are set (steps S53 and S54). If no data exist, an instruction is produced to stop the task of the kit data linkage section 24 (steps S53 and S55).

Figure 19:
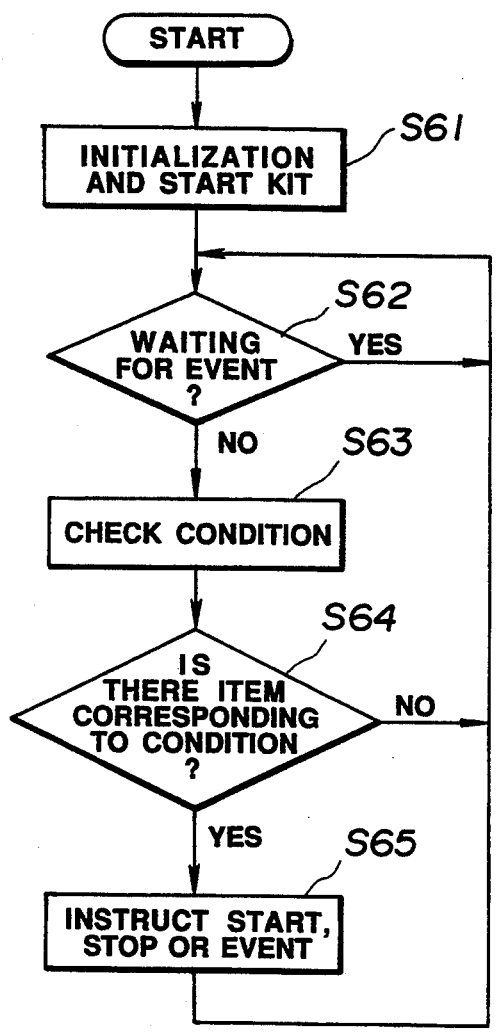
FIG. 19 is a flow diagram used in explaining the processes made in the kit start/stop timing control section.

FIG. 19 is a flow diagram used in explaining the processes made in the kit start/stop timing control section 26. When the kit start/stop timing control section 26 starts its operation, at the step S61, initializing and kit operating processes are performed. At the step S62, a determination is made as to whether or not an event occurrence signal is produced from the operating system interface (OSI) 5. After the receipt of the event occurrence signal, the condition are checked with reference to the table stored in the kit start/stop management table. If there is an item corresponding to the condition, a process such as "start", "stop" or "event" is selected to control the operation of a predetermined kit (steps S63 to S65). Since the parts operate in such a manner, the prepared basic programs are executed in a predetermined sequence to realize a process made according to a series of programs. The program can be modified with ease by selecting a program segment corresponding to a basic program to be modified and the data transfer mode without preparing the main flow chart if there is a basic program corresponding to the program segment to be modified.

What is claimed is:

1. An information managing apparatus comprising:
   storage means for storing a plurality of application kits each of which is defined by an execution element routine having an input register segment for registering input data, a processing segment and an output register segment for registering output data, the processing segment processing the input data to produce the output data;
   input means for inputting a selected kind of data selected from various kinds of data;
   means for detecting the kind of the inputted data;
   software kit interface means for selecting a group of application kits from the plurality of application kits, for coupling the input register segments of the selected group of application kits in parallel therewith, and for coupling the output register segments of the selected group of application kits in parallel therewith based on the detected kind of the inputted data to form an execution element routine, the software kit interface means executing the formed execution element routine to produce output data; and
   output means for outputting the output data from the software kit interface means.

2. The information managing apparatus as claimed in claim 1, further including:
   at least one memory for storing at least one existing execution element routine; and
   application program interface means having a library stored therein for converting a first function for the existing execution element routine into a standardized function used in an operating system interface means,
   the operating system interface means having a library stored therein for converting the standardized function into a second function used in the software kit interface means.

3. The information managing apparatus as claimed in claim 2, wherein the existing execution element routine has an input register segment for registering input data, a processing segment and an output register segment for registering output data,
   the processing segment of the existing execution element routine processing the input data to produce the output data, and
   wherein the software kit interface means is operative to select a group out of the plurality of application kits and the existing execution element routine and to couple the input register segments of the selected group of application kits and the input register segment of the existing execution element routine in parallel and to couple the output register segments of the selected group of application kits and the output register segment of the existing execution element in parallel based on the detected kind of the inputted data to form an execution element routine,
   the software kit interface means executing the formed execution element routine to produce output data.

4. The information managing apparatus as claimed in claim 1, wherein each of the application kits includes means for producing a data request signal specifying a least one of the output register segments of the application kits, and wherein the software kit interface means includes means responsive to the data request signal produced from one of the application kits for transferring the output data registered in the specified output register segment to the one application kit.

5. A computer implemented information managing apparatus comprising:
   storage means for storing a plurality of application program kits each of which is defined by an execution element routine having a program implemented input register segment for registering input data, a programmed processing segment and a program implemented output register segment for registering output data, the processing segment processing the input data to produce the output data;
   input means for inputting a selected kind of data selected from various kinds of data;
   program implemented detecting means for detecting the kind of the inputted data;
   program implemented software kit interface means for selecting a group of application program kits from the plurality of application program kits, for coupling the input register segments of the selected group of application program kits in parallel, and for coupling the output register segments of the selected group of application program kits in parallel based on the detected kind of the inputted data to form an execution element routine, the program implemented software kit interface means executing the execution element routine to produce output data; and
   output means for outputting the output data from the program implemented software kit interface means.

* * * * *